Jan. 13, 1942.　　　L. B. EHRLICH　　　2,269,623
WINDSHIELD WIPER ARM
Filed May 20, 1939
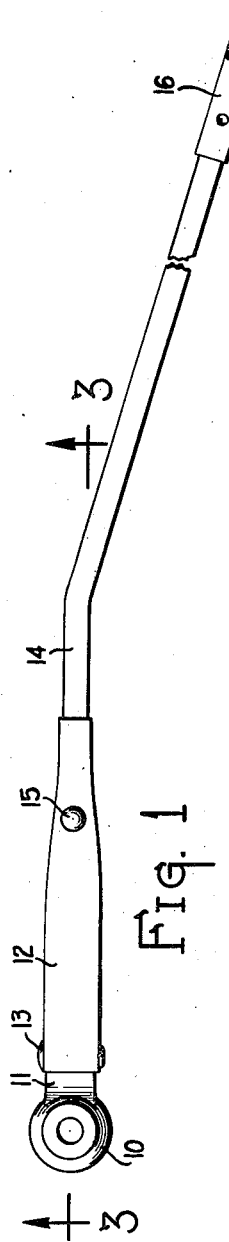
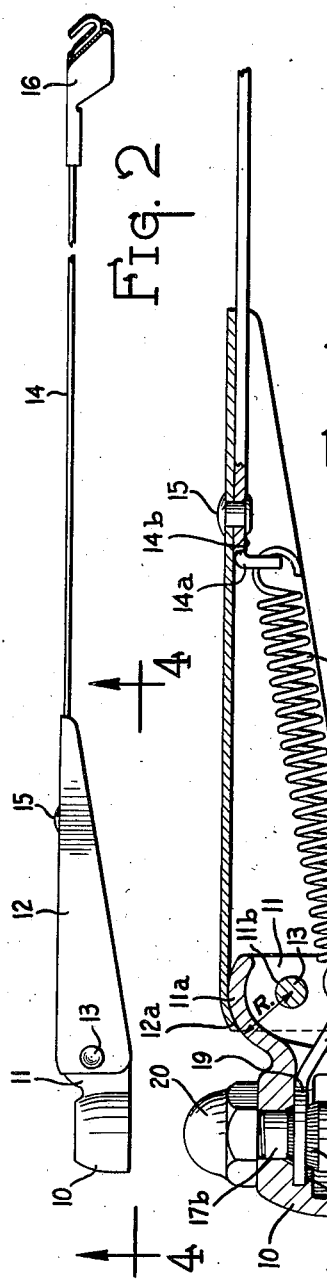
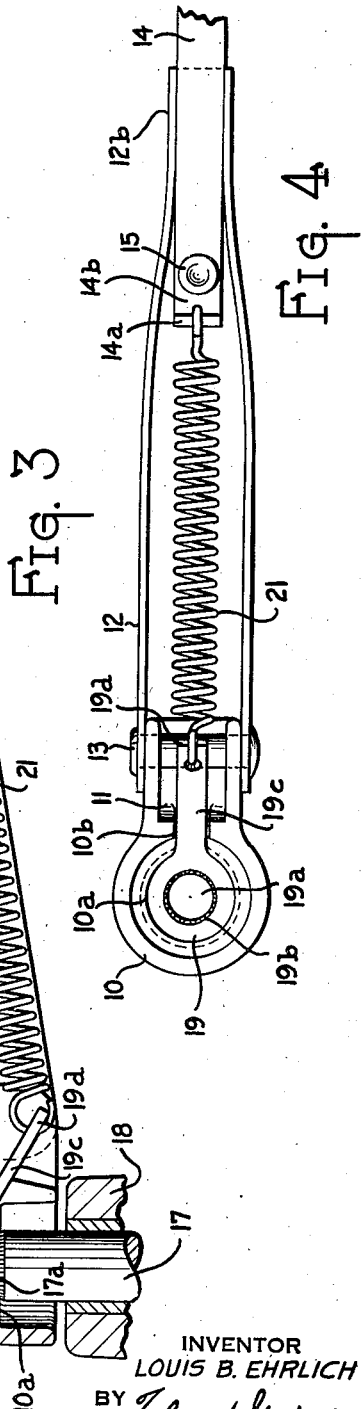
INVENTOR
LOUIS B. EHRLICH
BY *Falvey & Stoltenberg*
ATTORNEYS Patented Jan. 13, 1942

2,269,623

UNITED STATES PATENT OFFICE 2,269,623

WINDSHIELD WIPER ARM

Louis B. Ehrlich, Toledo, Ohio

Application May 20, 1939, Serial No. 274,753

2 Claims. (Cl. 15—255)

This invention relates to windshield wipers, more particularly to windshield wiper arms adapted to move a squeegee across the surface of windshield.

In the prior art, difficulty has been experienced in devising a windshield wiper arm whose angular relation having reference to the driving shaft and the windshield could be adjusted readily within a desirable range to give the most effective cleaning action. This invention contemplates the provision of a wiper arm which is adapted to be adjusted to varying angular relations, so that the sweep of the arm on the windshield can be readily controlled.

This invention further contemplates the provision of a wiper arm having a hinged connection with a driving shaft which presents a smooth unbroken surface appearance and which is adapted to be formed in part of die castings adequately supported by stronger materials at the point of greatest stress.

It is, therefore, an object of this invention to provide a windshield wiper arm adapted for ready fabrication, in which the die-cast parts are strengthened by inserts at the points of greatest stress.

It is a further object of this invention to provide a hinged windshield wiper arm which presents a smooth unbroken surface to an observer and which is at the same time readily adjusted in its angular relation with reference to its driving shaft.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawing forming a part of this specification wherein like reference characters designate corresponding parts in the several views.

Figure 1 is a plan view of the invention.

Figure 2 is an elevational view.

Figure 3 is a sectional elevational view taken along the line 3—3 of Figure 1.

Figure 4 is a bottom plan view taken along the line 4—4 of Figure 2.

Referring to the drawing, particularly to Figure 1, a cup-shaped anchor member 10 is provided, preferably a die-casting, which has an integral lateral projection 11 to which a channel-shaped member 12 of sheet metal is hinged about a rivet 13 for relative rotation thereabout, so that a wiper arm 14, which may be of flat strip-like construction, may oscillate a squeegee across the surface of a windshield. The arm 14 is preferably attached to the channel-shaped member 12 by means of a rivet 15 and is provided at its distal end with a squeegee attaching member 16 which may be of any convenient design. The arm 14 is shown in a bent conformation but it is to be understood that it may be formed in any desirable manner to suit the conditions under which it is to be used.

Referring to Figure 3, the details of construction of the cup-shaped member 10 are shown, the base of the cup-shaped member being apertured to cooperate with a driving means in the form of a shaft 17. The shaft 17 is journaled in a fixed member 18 and is preferably provided with a driving motor (not shown) which will oscillatably drive the shaft 17 through an angle of approximately 160 degrees so as to move the squeegee mounted on an arm 14 over the surface of the windshield for the cleaning operation.

The driving force from the shaft 17 is transmitted to the cup-shaped member 10 by means of a serrated shoulder 17a which cooperates with a driven member 19 preferably made of relatively strong material such as steel or the like, and having a central aperture 19a which may have serrations 19b to cooperate with the serrations of the shoulder 17a. The serrations are relatively small in size and spaced closely together, the serrations on the shoulder and the driven member being complementary and capable of being fitted together in a large member of different angular relations to facilitate the adjustment thereof. The shaft 17 is provided adjacent its forward end with a threaded stud 17b which projects beyond the bottom of the cup-shaped member 10 and is provided with a nut 20 to hold the cup-shaped member with the driven member in operative relation with the shaft 17. The driven member 19 is preferably in the form of a washer and is attached to the inside of the cup-shaped member at the bottom thereof by means of an inturned flange 10a cooperating with the periphery of the driven member 19. Adjacent one side of the driven member, a laterally extending lug 19c is provided which extends obliquely through an aperture 10b in the side of the cup-shaped member 10 and terminates approximately in the plane of the rivet 13.

The cup-shaped member 10 adjacent the aperture 10b has a laterally extending integral projection 11, mentioned above, which may be generally in the form of a channel as is clearly illustrated in Figure 4. The base 11a of the channel-shaped projection 11 is a cylindrical section which is concentric with the axis of the rivet 13. The cylindrical portion faces forwardly in the same direction as the end of the shaft 17 with its nut 20. This conformation gives a smooth and pleasing appearance to the hinge as is clearly shown in Figure 1.

The sides of the channel-shaped projection 11 are pierced with apertures 11b through which the rivet 13 projects to form a journal for the hinged parts. The rivet 13 is preferably rigidly fastened into the sides of the channel-shaped member 12 which is positioned on the outside of the projection 11. The rivet is maintained in non-rotating relation with the outer channel and forms the hinged relation by being rotatably journaled in the apertures 11b.

The channel-shaped member 12 is also provided with a cylindrical portion 12a adjacent its terminus to cooperate with the cylindrical portion 11a on a projection 11, being of slightly larger radius and also centered about the axis of the rivet 13. In this manner, when the channel-shaped member 12 rotated during the hinging action, the cylindrical faces will at all times remain in substantial contact.

In order to keep a squeegee mounted upon the arm 14 in resilient cooperative relation with the windshield, it is desirable to rotate the arm in clockwise direction about the rivet 13 (Figure 3) transverse in direction relative to the rotation of the driving means which will thrust the squeegee in the direction of the glass of the windshield. To attain this result, a resilient spring 21 is provided, anchored at one end to the terminus 19d of the lug on the driven means 19 located below the center of rotation of the arm 13, the other end cooperating with channel-shaped member 12 and the arm 14 by being attached to a turned-down flange 14a on the arm 14 adjacent the rivet 15. By controlling the length of the connecting strip 14b between the flange 14a and rivet 15, the tension of the spring 21 may be accurately controlled so as to determine the pressure with which a squeegee shall bear against the windshield.

Inasmuch as the arm 14 is attached to the channel-shaped member 12 by means of a single rivet, the channel-shaped member 12 adjacent its distal terminus 12b is narrowed down, so that the sides of the channel cooperate with the sides of the arm 14 to prevent the arm from turning about the rivet to hold the parts in fixed relation for transmitting the oscillating force to the squeegee.

The structure disclosed above is designed to facilitate fabrication in large quantities, so that the anchor member 10 which cooperates with the drive shaft 17 is made as a die-casting. The material used for die-casting is relatively soft and is incapable of carrying the stresses imposed by the serrations of the shoulder 17a, increasing the probabilities of break-down under continued use. The driven means 19 is designed to obviate this difficulty by strengthening the structure at the point of greatest stress, the forces are transmitted from the driving member 17 to the driven member 19 and thence to the anchor member 10, which, in turn, transmits it to the channel-shaped member 12 and the arm 14.

It is to be understood that the above detailed description of the present invention is intended to disclose an embodiment thereof to those skilled in the art, but that the invention is not to be construed as limited in its application to the details of construction and arrangement of parts illustrated in the accompanying drawing, since the invention is capable of being practiced and carried out in various ways without departing from the spirit of the invention. The language used in the specification relating to the operation and function of the elements of the invention is employed for purposes of description and not of limitation.

What is claimed is:

1. In a device of the class described, a shouldered driving member, a non-frangible driven member having an aperture adapted to be seated on the shoulder and to form a driving connection therewith, a cup-shaped housing of relatively frangible material having an aperture in its base concentric with the driven member and adapted to be positioned above the driven member to embrace the driven member, a lateral integral projection on the driven member adapted to project through an aperture in the side of the cup-shaped housing, a channel-shaped lateral projection on the housing around the lateral projection of the driven member, a channel-shaped member embracing the channel-shaped lateral projection, journal means transverse of the axis of the driving member to alloy relative rotation between the channel-shaped lateral projection and the channel-shaped member, resilient means acting between the lateral projection of the driven means and the channel-shaped member to restrain relative rotation with the channel-shaped lateral projection in one direction, and an elongated arm cooperating with the channel-shaped member adapted to drive a squeegee.

2. In a device of the class described, a driving member, a non-frangible driven member, means cooperating with the driving member and the driven member to allow transmission of force, a cup-shaped casing of relatively frangible material surrounding the driven member which cooperates with the bottom thereof, a lateral projection integral with the cup-shaped casing, a cylindrical surface on the projection, a box-like channel-shaped member cooperating with the lateral projection and having a cylindrical surface in touching relation with the cylindrical surface on the lateral projection, journal means to form a hinge between the lateral projection and the channel-shaped member to allow relative rotation therebetween, said journal means being concentric with the cylindrical surfaces on the lateral projection and the channel-shaped member, an aperture in the cup-shaped casing adjacent the lateral projection, an integral lug on the driven member extending through the aperture and terminating at a point displaced from the journal on the side opposed to the position of the cylindrical surfaces, and resilient means acting between the terminus of the lug and the channel-shaped member to restrain rotation of the channel-shaped member in one direction.

LOUIS B. EHRLICH.